Sept. 17, 1929.   W. E. B. HASSELKUS   1,728,240
FULL VISION WINDSHIELD
Filed May 3, 1928
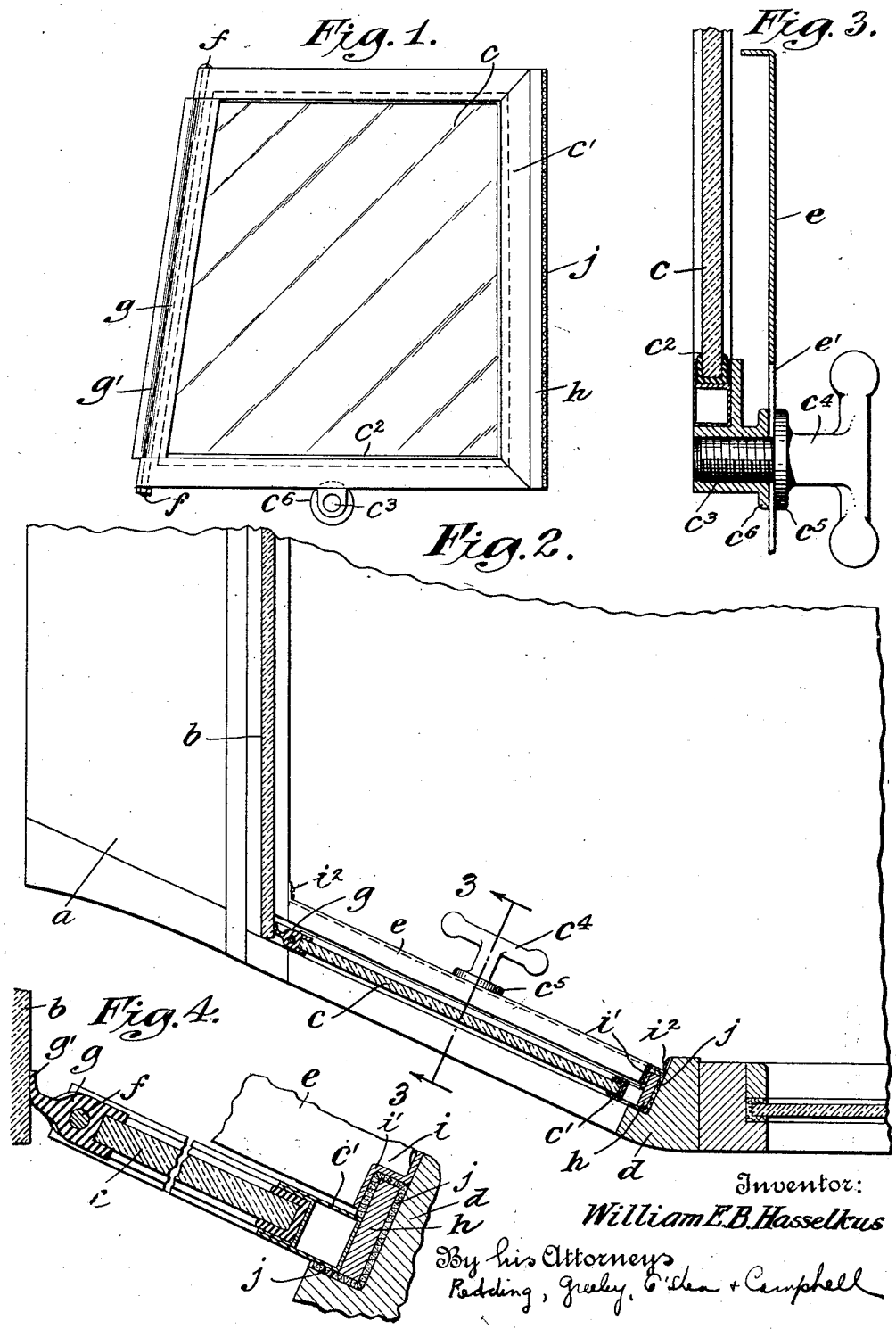

Patented Sept. 17, 1929

1,728,240

UNITED STATES PATENT OFFICE

WILLIAM E. B. HASSELKUS, OF JAMAICA, NEW YORK, ASSIGNOR TO INTERNATIONAL MOTOR COMPANY, OF NEW YORK, N. Y., A CORPORATION OF DELAWARE

FULL-VISION WINDSHIELD

Application filed May 3, 1928. Serial No. 274,760.

The present invention relates to windshields which are constructed to give a full and unimpaired vision to the front and sides of the operator of a vehicle. In windshields of the type having a front section and quarter sections or sections which extend rearwardly from the front portion to increase the field of vision of the operator, considerable difficulty has been experienced in providing a supporting means at the ends of the front section between the several elements. In previous designs, the quarter sections and the ends of the front section are carried either slidably or fixedly in window posts which extend from the cowl to the roof of the vehicle. This post although necessary to provide a weather-tight connection between the front and quarter sections, is quite objectionable since it obstructs and confuses the vision in certain directions.

An object of the present invention is to provide a full vision windshield, the quarter sections of which are adjustable vertically, and the construction of which is such that the vision is not impaired in any direction. Incorporated in this construction is a joint between the front and quarter sections which is weather-tight and occupies very little space.

The specific construction includes a quarter window which is used in connection with a front windshield portion mounted with a rake or in a rearwardly sloping position. The mounting of the quarter window is such that it is positively guided in a true vertical path even though one side thereof is unsupported.

Further objects and advantages will appear as the description of the invention proceeds and reference will now be made to the accompanying drawings for a more detailed description thereof.

Figure 1 is a view in side elevation showing the quarter window construction according to the present invention.

Figure 2 is a horizontal sectional view taken through the windshield.

Figure 3 is a view in section taken on line 3—3 of Figure 2, and looking in the direction of the arrows.

Figure 4 is a view similar to Figure 2, but enlarged to show the manner in which the quarter window is mounted.

Referring to the above drawings, $a$ indicates a vehicle cowl carrying a front windshield $b$, shown as being raked in accordance with the slope of the left-hand wall of the quarter window shown in Figure 1. Associated with this front section, are side or quarter sections $c$ mounted between the front portion and window post $d$ of the vehicle. The quarter section $c$ is mounted in a frame $c'$ which extends around the top, bottom and straight side of the glass and carries suitable cushioning means $c^2$ to protect the glass. At the botom of the frame, a threaded aperture $c^3$ is provided to receive the adjusting and clamping bolt $c^4$. This bolt rides in a slot $e'$ formed in the inner panel $e$ of the vehicle below the quarter window. Cooperating faces $c^5$ and $c^6$ engage the panel at the sides of the slot $e'$ to hold the window in a desired position.

The ends of the frame $c'$ project a short distance beyond the side of the pane of glass $c$ and are provided with apertures through which a through bolt $f$ extends. A bead of rubber $g$ is provided with an axial hollow portion through which the through bolt $f$ extends and in this manner the rubber bead is held securely in position by the bolt $f$ which also serves to hold the frame securely around the pane of glass $c$. A wiping bead $g'$ is formed on the rubber $g$ and provides a weather-tight joint between the front and quarter sections when the latter are secured in their closed positions.

Along the straight side of the frame $c'$, a strip $h$ is provided which extends beyond the inner side of the frame $c'$. This serves as a guide for the window and in conjunction with guide plate $i$ which is formed with an angular channel $i'$, constrains the movement of the window to a purely vertical path. The guide plate $i$ may be a continuation of the inner panel $e$ and may be secured to the window post $d$ and cowl $a$ by suitable screws $i^2$. Between the guide plate and window post and the guide $h$ a felt liner $j$ is provided.

The construction described above provides a full vision windshield with quarter sections which are vertically slidable. Between the quarter sections and the front section, weathertight joints are provided which do not impair the vision of the operator. The mounting of the quarter section is such that the sliding of the window takes place in a vertical direction only and the quarter section may be adjusted in any desired position quite readily.

I claim as my invention:

1. A full vision windshield comprising a front center section, a side quarter section, a frame extending around three edges of the quarter section, means to mount the quarter window slidably, a through bolt along the fourth edge of the quarter section connecting the ends of the frame and a bead positioned by the bolt along the fourth edge of the quarter section for abutment with the center section.

2. A full vision windshield comprising a front center section, a side quarter section, a frame extending around three sides of the quarter section, a guide carried by one side of the frame, a guide plate cooperating with the guide to constrain the movements thereof to a vertical direction, a through bolt connecting the ends of the frame, a rubber bead through which the through bolt extends, and means to adjust the position of the window.

3. A full vision windshield comprising a raked front center section, a side quarter section having one side slanting to engage the side of the front section, a frame extending around the top, bottom and vertical side of the quarter window, a guide carried by the vertical side of the frame, a through bolt connecting the ends of the frame, a rubber bead carried by the through bolt, a guide plate for constraining the movement of the guide in a vertical direction, and means to adjust the position of the window.

4. In a windshield, a glass piece, a frame extending around three sides of the glass in engagement therewith, the two free ends of the frame extending beyond the edge of the glass, a bolt passing through the extended parts of the frame, and a strip of yielding, non-metallic material surrounding the bolt and abutting against the edge of the glass.

This specification signed this 23rd day of April A. D. 1928.

WILLIAM E. B. HASSELKUS.